United States Patent [19]

Crahay

[11] Patent Number: 4,536,639

[45] Date of Patent: Aug. 20, 1985

[54] REGULATING SURFACE TREATMENT BY LASER BEAM

[75] Inventor: Jean R. Crahay, Francorchamps, Belgium

[73] Assignee: Centre de Recherches Metallurgiques Centrum Voor, Brussels, Belgium

[21] Appl. No.: 466,614

[22] Filed: Feb. 15, 1983

[30] Foreign Application Priority Data

Feb. 17, 1982 [BE] Belgium ............................ 892184

[51] Int. Cl.³ .............................................. B23K 26/02
[52] U.S. Cl. ....................... 219/121 LU; 219/121 LX
[58] Field of Search ................... 219/121 LU, 121 LV, 219/121 LA, 121 LB, 121 LX, 121 LP, 121 LR

[56] References Cited

U.S. PATENT DOCUMENTS 4,125,755  11/1978  Plamquist ..................... 219/121 LB

FOREIGN PATENT DOCUMENTS 0065400  5/1977  Japan ............................ 219/121 LB
0109589  8/1980  Japan ............................ 219/121 LV

*Primary Examiner*—C. L. Albritton
*Attorney, Agent, or Firm*—Holman & Stern

[57] ABSTRACT

A laser beam is focused as a cone whose apex is to be located on the surface of a part to be treated. A reference distance between the surface and a given point of the focusing element is determined, at which the apex is located on the surface. The actual distance between the surface and the given point is measured and the difference between the actual distance and the reference distance is determined. The focusing element is displaced so that the difference determined is cancelled.

11 Claims, 1 Drawing Figure

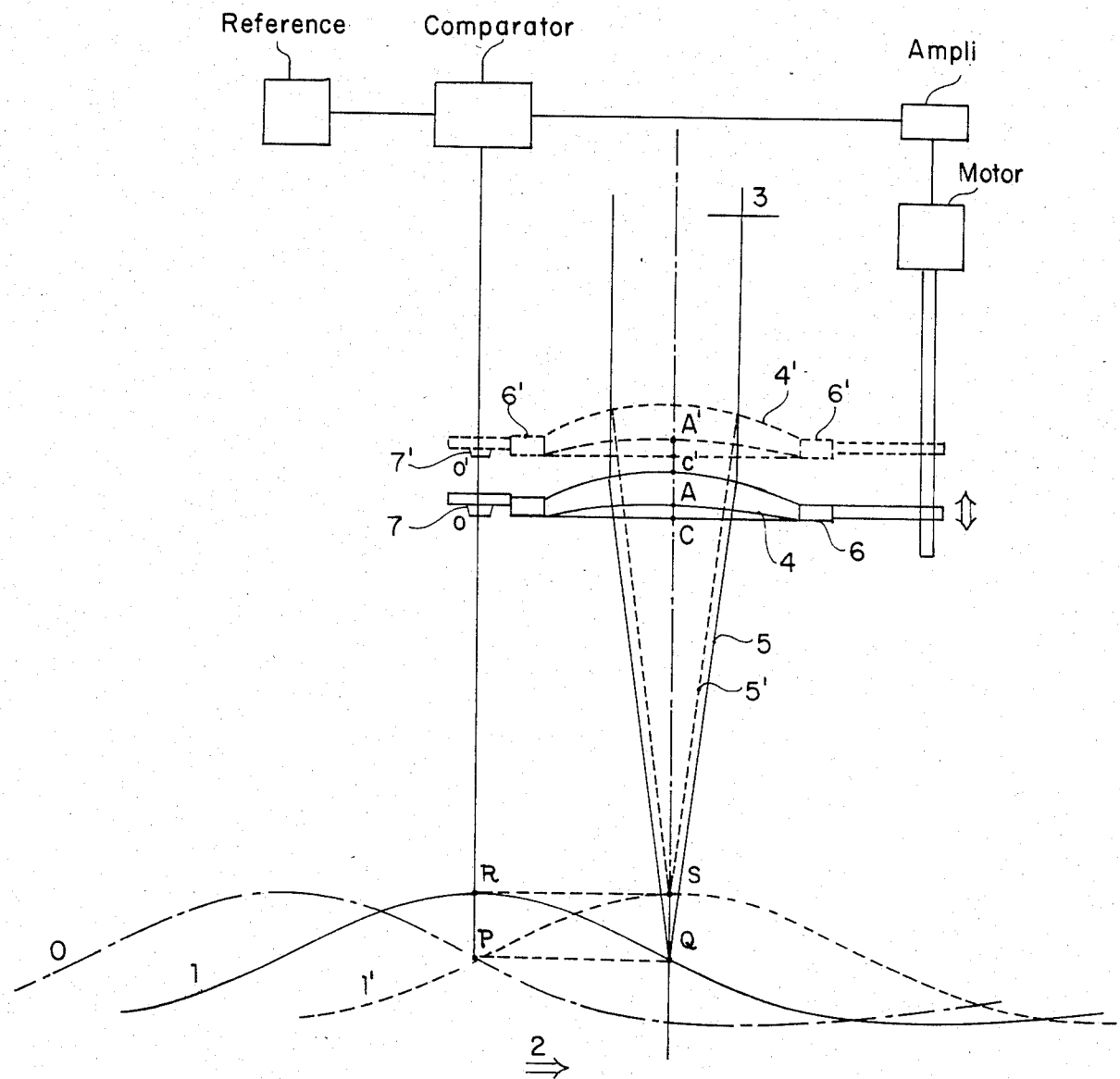

REGULATING SURFACE TREATMENT BY LASER BEAM

FIELD OF THE INVENTION

The present invention relates to a method for regulating the position of the focusing plane in a treatment of parts by means of a focused laser beam.

BACKGROUND OF THE INVENTION

Numerous operations are known, in particular in mechanical engineering, in which a tool may be replaced by a focused laser beam. As an example there may be cited various machining operations, such as stamping or boring, assembly operations, such as welding, or surface heat treatment. In all these operations the laser beam is focused by a suitable optical system, such as a lens or a curved mirror; it thus forms a focusing cone whose apex, located in the focal plane of the optical system used, has the maximum light power density of the beam. For reasons of energy saving and operational precision, this maximum power point has to be positioned as accurately as possible with respect to the treated part; for example, in the case of surface treatment the focal point is usually brought into the plane tangential to the surface of the part at the point where the intended operation is to be performed.

Although it is important that this point is positioned correctly with respect to the part to be treated, it is equally important that this relative position remains as constant as possible.

This condition is the more difficult to fulfill if the parts are moving or if they sometimes have somewhat irregular surfaces. It is, however, indispensable for ensuring uniform and reproducible treatment of the part. The constancy of the relative position is the more critical, the shorter the focal length of the optical system, i.e. the greater the aperture angle of the focusing cone.

By way of example, a parallel laser beam with a diameter of 20 mm and a wavelength of 10.6 $\mu$m, focused by a lens whose focal length is 60 mm, has a diameter of 0.1 mm at the focus, with a depth of field of 0.03 mm.

The position of the focus of an optical system with respect to the active element of this system, for example a lens, is generally known. In order to maintain this focus in the surface plane of the part, it is necessary to ensure and maintain a constant distance between the surface plane of the part and any point of the active element of the optical system. In the case of a lens, this point may in particular be the point at which the axis of the laser beam passes through the median plane of the lens.

DISCLOSURE OF THE INVENTION

The present invention relates to a method for maintaining constant the distance between the surface of a part to be treated and an optical element focusing a laser beam. It also relates to a method enabling this distance to be automatically returned to the desired constant value when it deviates therefrom.

The invention provides a method of regulating surface treatment by means of a focused laser beam, in which the distance between the surface of the part and any point of the focusing element is determined, for which the apex of the cone for focusing the said beam is located in the surface plane of the part at the point where the said treatment is to be performed, this distance being designated the reference distance, the actual distance between the said surface and the said point of the focusing element is measured, the difference between the said reference value and the said actual measured value is determined, and the focusing element is moved such that the difference established between the reference value and the measured value of the said distance is cancelled.

BRIEF DESCRIPTION OF THE DRAWINGS

The single FIGURE is a diagrammatic illustration of the manner in which the method of the present invention may be performed.

BEST MODE OF CARRYING OUT THE INVENTION

A laser beam with a diameter of 20 mm and a wavelength of 10.6 $\mu$m is focused by a focusing element comprising a lens whose focal length is 60 mm. Accordingly, the reference distance between the surface of a part to be treated by the focused beam and the point at which the axis of the beam passes through the median plane of the lens is 60 mm, when the apex of the focusing cone is on the said surface.

Referring specifically to the drawing, consider a surface 1 of a workpiece to be treated moving in a direction of arrow 2. For example, the workpiece surface 1 may be heated by a laser beam 3. This laser beam passes through a lens 4 held in a frame 6. The lens focuses the laser beam 3 into a conical shaped side having an apex which must be located at the treatment point of surface 1. The lens 6 carries a sensor 7 for measuring the distance between the surface 1 and an arbitrary point of the lens assembly 4, 6. The measurement system is not part of the invention; therefore, any known system may be employed. The device illustrated in the drawing comprises a sensor which measures the distance between a point O, fixed with respect to the lens assembly, and the surface 1, in a direction parallel to the axis of the laser beam 2.

It is well known in the art that the surface of a workpiece is never perfectly plane so that the representation of surface 1 in the drawing is a somewhat wavy profile. The method of the present invention involves regulating the location (i.e., distance) of the lens with respect to irregularities of the surface 1.

In the described embodiment, sensor 7 is located at a known distance OC above the laser beam axis with respect to the movement of the workpiece. The speed of the workpiece is known; therefore, it is possible to determine the time necessary for the workpiece to move a distance equivalent to $\overline{OC}$ (i.e., from position 1 to position 1') whereby C is a point at which the beam axis perpendicularly passes through the plane containing point O. In position 1, represented by solid lines, the lens assembly 4, 6 is positioned so that the apex of the cone 5 is located at point Q on surface 1. In this embodiment, C is the arbitrarily chosen point of the optical system, and $\overline{CQ}$ is therefore equal to the reference distance. Point Q of the surface is situated at P when the surface is in a previous position O shown in broken line.

When the surface is in position 1, sensor 7 measures the distance OR which is shorter than $\overline{OP} = \overline{CQ}$ in the illustrated condition. According to the invention, the value of the distance OR is compared with the reference distance $\overline{OP}$, and the difference between the two distances is determined and generates a signal representative of this difference. The signal is applied to a motor which drives the lens assembly along a distance $\overline{CC'}=\overline{PR}$, so that the lens assembly is located in a position 4', 6' (as shown in dashed lines) when point R arrives at S (i.e., when the surface reaches position 1'). In this way, the lens assembly 4, 6, and therefore the cone 5, move to a position 4', 6' and 5' wherein the apex of the cone is located again on the surface to be treated, namely at point S.

The measurement of actual distances such as $\overline{OP}$ and $\overline{OR}$ may be performed at any desired frequency and in a continuous manner without departing from the scope of the claimed method.

The distance between the surface of the part and the said point is measured continuously or intermittently. In a particularly advantageous manner, the actual value of the said distance may be measured electrically, electromagnetically, or optically, an electrical signal is generated which represents the established variation with respect to the said reference value, and this electrical signal is applied to means for controlling the displacement of the focusing element.

It has been found particularly advantageous to determine the variation of the difference between the actual value of the said distance and its reference value by measuring the variation of a physical magnitude, in particular an electrical, electromagnetic, or optical magnitude, with respect to a reference value of the said physical magnitude, which represents a zero difference.

It is understood that the invention is not limited to the embodiments described above, but that it also includes any equivalent means enabling the methods described in the following claims to be performed.

I claim:

1. A method for regulating the position of a focusing element with respect to the surface of the moving part to be treated by a laser beam, wherein the laser beam is focused by said focusing element as a cone having an apex to be located on the surface of said moving part, the method comprising the steps of:
   initially positioning said focusing element so as to locate said apex at a first point of said surface;
   choosing a point of the focusing element;
   determining the distance between said first point of the surface and said point of the focusing element, said distance being taken as a reference distance;
   measuring the actual distance between said point of the focusing element and another point of the surface of said moving part;
   comparing said actual distance and said reference distance;
   determining the difference between said actual distance and said reference distance; and
   displacing said focusing elements to take up any difference between the said difference between said actual distance and said reference distance.

2. The method of claim 1, including generating an electrical signal representing the said difference, and applying the electrical signal to means for controlling displacement of the focusing element.

3. The method of claim 2, in which the said actual distance is measured electrically.

4. The method of claim 1, including measuring the variation of the said difference by measuring the variation of a physical magnitude with respect to a reference value of the said physical magnitude which represents a difference of zero, the said physical magnitude being a function of the said difference.

5. The method of claim 4, in which the said physical magnitude is an electrical magnitude.

6. The method according to claim 1 wherein said reference distance is the focal distance of the focusing element.

7. The method of claim 2 wherein said actual distance is measured electromagnetically.

8. The method of claim 2 wherein said actual distance is measured optically.

9. The method of claim 4 wherein the said physical magnitude is an electromagnetic magnitude.

10. The method of claim 4 wherein said physical magnitude is an optical magnitude.

11. The method according to claim 1 wherein said reference distance is determined from the focal distance of the focusing element by means of simple geometrical relations.

* * * * *